(12) United States Patent
Johansson et al.

(10) Patent No.: US 6,769,192 B2
(45) Date of Patent: Aug. 3, 2004

(54) MEASURING DEVICE

(75) Inventors: Hakan Johansson, Atvidaberg (SE); Lars Nilsson, Atvidaberg (SE)

(73) Assignee: JNE AB (SE)

( * ) Notice: Subject to any disclaimer, the term of this patent is extended or adjusted under 35 U.S.C. 154(b) by 0 days.

(21) Appl. No.: 10/342,674

(22) Filed: Jan. 15, 2003

(65) Prior Publication Data
US 2003/0131490 A1 Jul. 17, 2003

(30) Foreign Application Priority Data

Jan. 17, 2002 (SE) .............................................. 0200126

(51) Int. Cl.$^7$ ................................................ G01B 3/08
(52) U.S. Cl. ......................................... 33/608; 33/809
(58) Field of Search ......................... 33/288, 608, 809, 33/DIG. 1

(56) References Cited

U.S. PATENT DOCUMENTS

| | | | |
|---|---|---|---|
| 611,625 A | 10/1898 | Goddard | |
| 2,781,582 A | 2/1957 | Wursch | |
| 3,068,573 A | 12/1962 | Sidwell | |
| 3,151,396 A | * 10/1964 | Junkins | ...................... 33/288 |
| 3,512,261 A | 5/1970 | Viollet | |
| 3,699,659 A | 10/1972 | Roeller | |
| 4,015,338 A | 4/1977 | Kunze et al. | ................. 33/228 |
| 4,142,299 A | 3/1979 | Alsina | ......................... 33/288 |
| 4,294,016 A | 10/1981 | Wilkerson | |
| 4,329,784 A | 5/1982 | Bjork | |
| 4,330,945 A | 5/1982 | Eck | ............................ 33/288 |
| 4,366,624 A | 1/1983 | Bergstrom | |
| 4,407,073 A | 10/1983 | Nilsson et al. | |
| 4,432,144 A | 2/1984 | Carlsson | |
| 4,442,608 A | 4/1984 | Clausen | ....................... 33/288 |
| 4,473,954 A | 10/1984 | Vilches | |
| 4,490,918 A | 1/1985 | Clausen | ....................... 33/288 |
| 4,513,508 A | 4/1985 | Jarman et al. | ................. 33/288 |
| 4,523,384 A | 6/1985 | Giacomini | |
| 4,578,870 A | 4/1986 | Cooke | .......................... 33/288 |
| 4,598,481 A | 7/1986 | Donahue | ...................... 33/288 |
| 4,621,431 A | * 11/1986 | Fatool et al. | .................. 33/809 |

(List continued on next page.)

FOREIGN PATENT DOCUMENTS

| | | | |
|---|---|---|---|
| DE | 3209582 | 3/1982 | ........... G01B/11/16 |
| EP | 0215540 | 4/1986 | ........... G01B/11/24 |
| EP | 1006801 | 12/1994 | |
| SE | 7302067 | 2/1973 | ........... G01B/11/10 |
| WO | WO 99/24781 | 5/1999 | ........... G01B/5/004 |

OTHER PUBLICATIONS

"Drive On Dataliner 3000" Dataliner pamphlet, 8 pages, no date.
"Quick–Easy–Correct Working Posture" Uno Liner pamphlet, 1 page, no date.
"Wedge Clamp–Platform System" Wedge Clamp System pamphlet, 5 pages, no date.
"Precision Measuring, We make it easy . . . and affordable" XPtm Measuring System by Duz–Mor pamphlet, 3 pages, no date.
"Car–O–Liner High Measuring Point Accessory" Car–O–Liner M234 HMP Pamphlet, 2 pages, no date.

Primary Examiner—G. Bradley Bennett
(74) Attorney, Agent, or Firm—Hayes Soloway P.C.

(57) ABSTRACT

An extension ruler intended for symmetry measurements of vehicles, having a built in measuring device for the extension of the ruler and transfer of data or figures to a display. The measuring device includes a tape extending from one end of the ruler to the other end where the tape is wound on a drum spring biased in the winding direction, which drum is provided with teeth and that the passage of these is detected and counted by a light source and a photo diode and that the drum rotation detected in this way is used to provide a measure of the extending of the ruler.

10 Claims, 4 Drawing Sheets

U.S. PATENT DOCUMENTS

| | | | | |
|---|---|---|---|---|
| 4,621,435 A | | 11/1986 | Higginbotham | 33/520 |
| 4,630,379 A | | 12/1986 | Wickmann et al. | 33/288 |
| 4,663,855 A | | 5/1987 | Hamilton et al. | 33/288 |
| 4,683,663 A | | 8/1987 | Sarauer | 33/288 |
| 4,691,443 A | | 9/1987 | Hamilton et al. | 33/288 |
| 4,731,936 A | | 3/1988 | Aldrich et al. | 33/608 |
| 4,922,623 A | | 5/1990 | Aldrich et al. | 33/608 |
| 4,934,063 A | * | 6/1990 | Speisser | 33/608 |
| 4,939,848 A | * | 7/1990 | Armstrong | 33/608 |
| 4,958,439 A | | 9/1990 | Dehn | 33/608 |
| 5,029,397 A | | 7/1991 | Palombi | 33/288 |
| 5,131,257 A | * | 7/1992 | Mingardi | 33/608 |
| 5,207,002 A | | 5/1993 | Humblet | 33/288 |
| 5,317,813 A | * | 6/1994 | Reed | 33/809 |
| 5,343,628 A | | 9/1994 | Ham | 33/608 |
| 5,408,755 A | * | 4/1995 | Russell | 33/608 |
| 5,507,101 A | | 4/1996 | Mason | 33/608 |
| 5,515,613 A | | 5/1996 | Hinson | 33/288 |
| 5,522,145 A | | 6/1996 | Chisum | 33/288 |
| 5,636,445 A | | 6/1997 | Johansson et al. | 33/288 |
| 5,647,139 A | | 7/1997 | Richardson | 33/608 |
| 5,848,477 A | | 12/1998 | Wiedmann et al. | |
| 6,115,927 A | | 9/2000 | Hendrix | 33/288 |
| 6,550,156 B1 | * | 4/2003 | Scoville | 33/809 |
| 6,598,308 B1 | * | 7/2003 | Johansson et al. | 33/608 |

* cited by examiner

MEASURING DEVICE

BACKGROUND OF THE INVENTION

In order to check and measure the damage to crashed cars before, during and after repair, telescopically extendable measuring devices or rulers provided with perpendicularly upwards extending mandrels in both ends are used. A ruler that is provided with a magnetic fastening bracket in one end (SE 9704438-2) is also used in this type of application. These devices are simple, easy to handle and result in surprisingly highly precise work. In reality, however, these devices require writing down or remembering measurements between device measures. Furthermore, the precision of these devices is dependent on the skill or measuring technique of the device operator, since inclining the ruler may change the result. Likewise, operator skill and environmental conditions when reading scales are of essential influence.

An additional error source in prior art measuring rulers is that the magnet fastener, which allows fast and simple handling of the device by one person even for long measurements, is prone to mounting that introduces a slight error. Mounting the prior art device in different ways on the left and right side can give different measures even if the measure should be the same. In addition, a little dirt under the magnet gives an inclination the fastener that may cause the device to mis-measure.

Thus, the object of this invention is to create a measuring device that overcomes the above problems with the prior art devices without impairing the simplicity and ease of use of the device.

SUMMARY OF THE INVENTION

In accordance with the invention, a telescopically extendable ruler is provided with measurement mandrels or suitable measurement bodies in the ends, the ruler being provided with a digital measuring means. The previous scale is thus replaced with an electronic measuring apparatus and indication of the measure. In this way, it is no longer necessary that the user is in the precisely correct place on the side of the measuring device in order to see the scale. Further, the risk that a user might shadow the scale thereby being unable to read the device is also reduced and, since the device stores measured values, values are ready for comparison, even if several minutes lapse between measurements. If so desired, one can measure absolute values or measure differences between measures taken on an undamaged area of the car, and a measure taken on a damaged area. The later type of technique facilitates, in particular, measurements taken during straightening operations. It is also easier to remember small figures than larger ones.

The present invention also joins the ruler to a centering mandrel or cone, while a magnet placed over the cone is moveable. By additionally making the ruler moveable about a universal joint, the ruler can be centered within a hole, from where measurements are to be taken. Thus, the measurements of the current device will not be influenced by the inclination of the magnet, caused by a locally dented surrounding, dirt, underbody coating, etc.

Since the force that the centering mandrel or cone is subjected to is exclusively directed towards, a vehicle, the centering tip or cone, which is journaled on a ball, can be provided with some type of snap lock so than one simply snaps the conical tip on the universal joint. In this way one can use different cones of varying length depending on the size of the hole. Thus, it is actually possible to place the universal joint precisely in the center of the hole. One can also contemplate the use of other types of points or tips.

In order further to simplify the current device, the device is provided with an adjustable spirit level on the side or on top of the ruler, extending along the length of the ruler. In this way it becomes possible to take a measurement between two known and undamaged points in the longitudinal direction of the car. The measuring mandrel located at the outer end of the ruler is adjusted to the height required to give an orientation to the ruler parallel to the datum plane of the car. The spirit level is now adjusted to an entirely level position. The spirit level together with its fastening bracket is then turned 180° and then the entire ruler is turned or moved so that its ends change position in relation to the vehicle that is to be measured. The spirit level will now, with the ruler placed lengthwise along the car, represent a definition of the datum plane of the vehicle, allowing quick and normalized measuring. A supposition for this is that the vehicle stands comparatively even laterally, but since this normally is the case, it is not a problem. However, it is more common that the vehicle is inclined in its length direction.

The electronic digital measuring of the extension of the ruler is preferably done by means of a device located in one of the telescoping tubes. The device comprises a thin metal tape that is fastened in the other end of the ruler. The tape runs over a rotatable drum. A spring device is arranged to pretension the drum so that the tape always is kept stretched. The extended length is then detected by the drum or roller for the tape having a toothed or screen pattern provided wheel that passes between a light source and a photo detector generating pulses as the drum or wheel rotates and the pulses can then simply be counted and transformed to measures shown on a display in the end of the ruler, either in millimeters or in inches.

DESCRIPTION OF THE FIGURES

Further advantages and characteristics of the invention are apparent from the following description of a preferred embodiment of the invention with reference to the enclosed drawings.

FIG. 4 shows an adjustable spirit level on top of the ruler; and

DETAILED DESCRIPTION OF THE INVENTION

Figure 1:
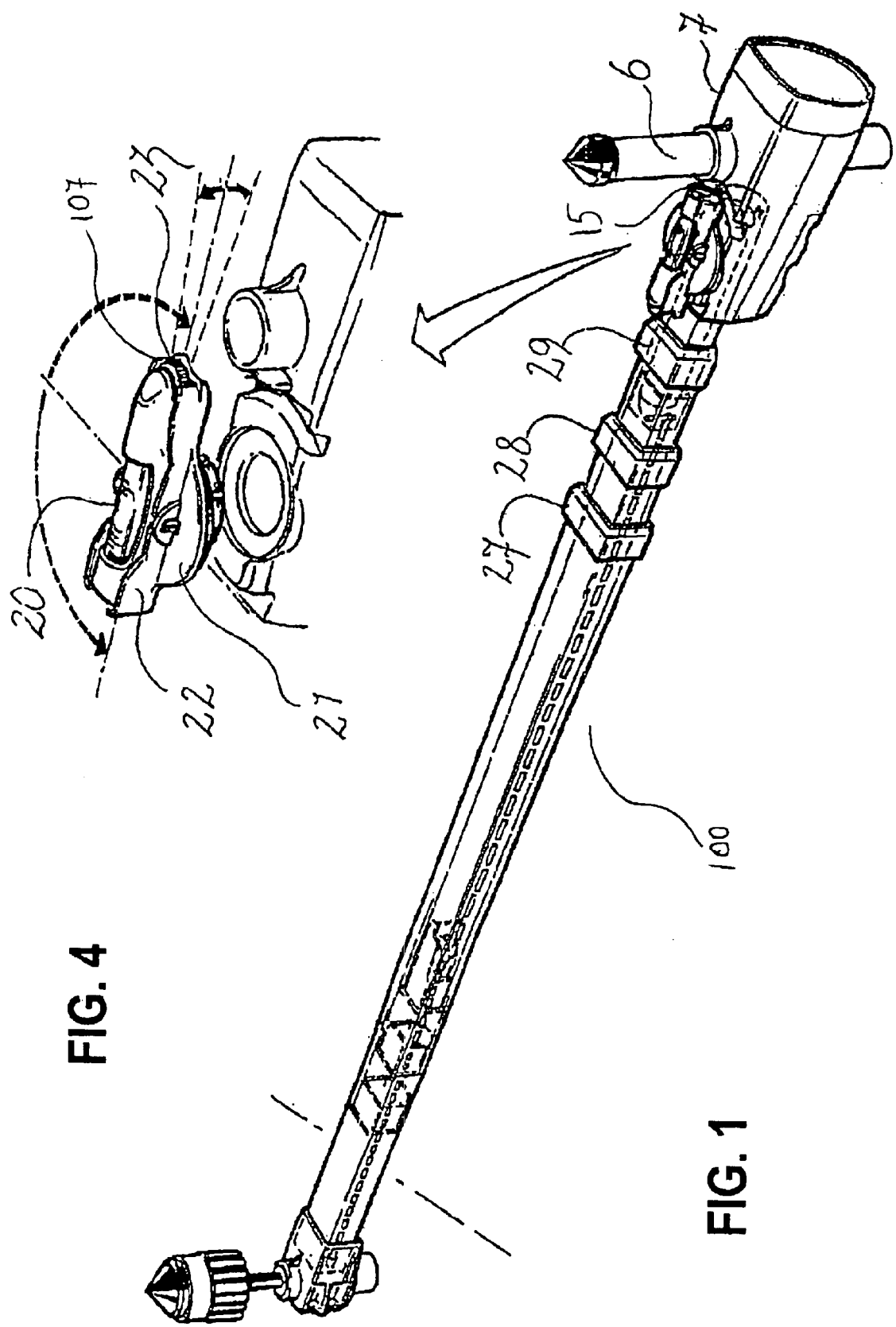
FIG. 1 shows a measuring ruler in accordance with the invention in a perspective view and partly in section.
Figure 2:
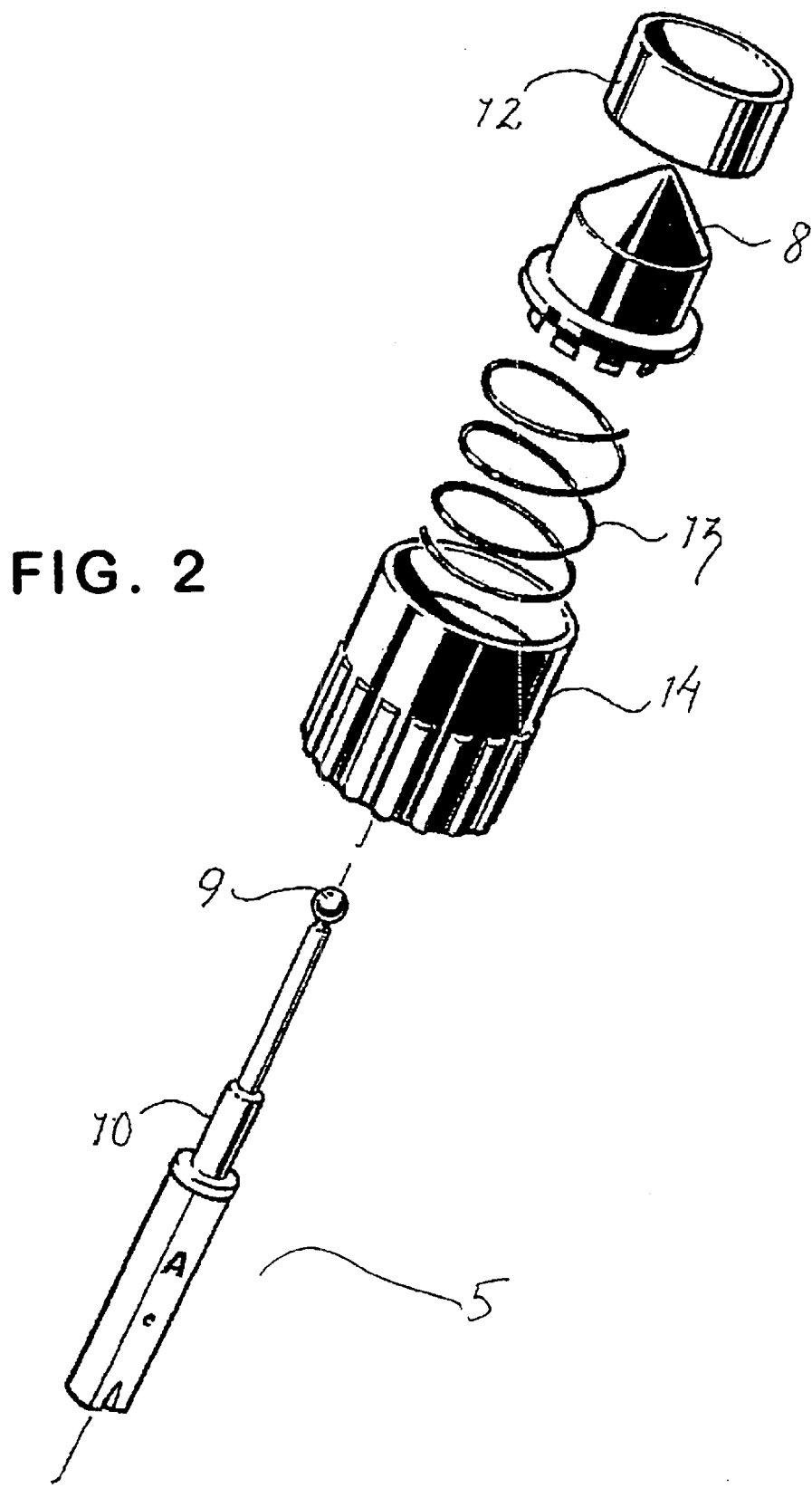
FIG. 2 shows an exploded view of a magnet fastening bracket.
Figure 3:
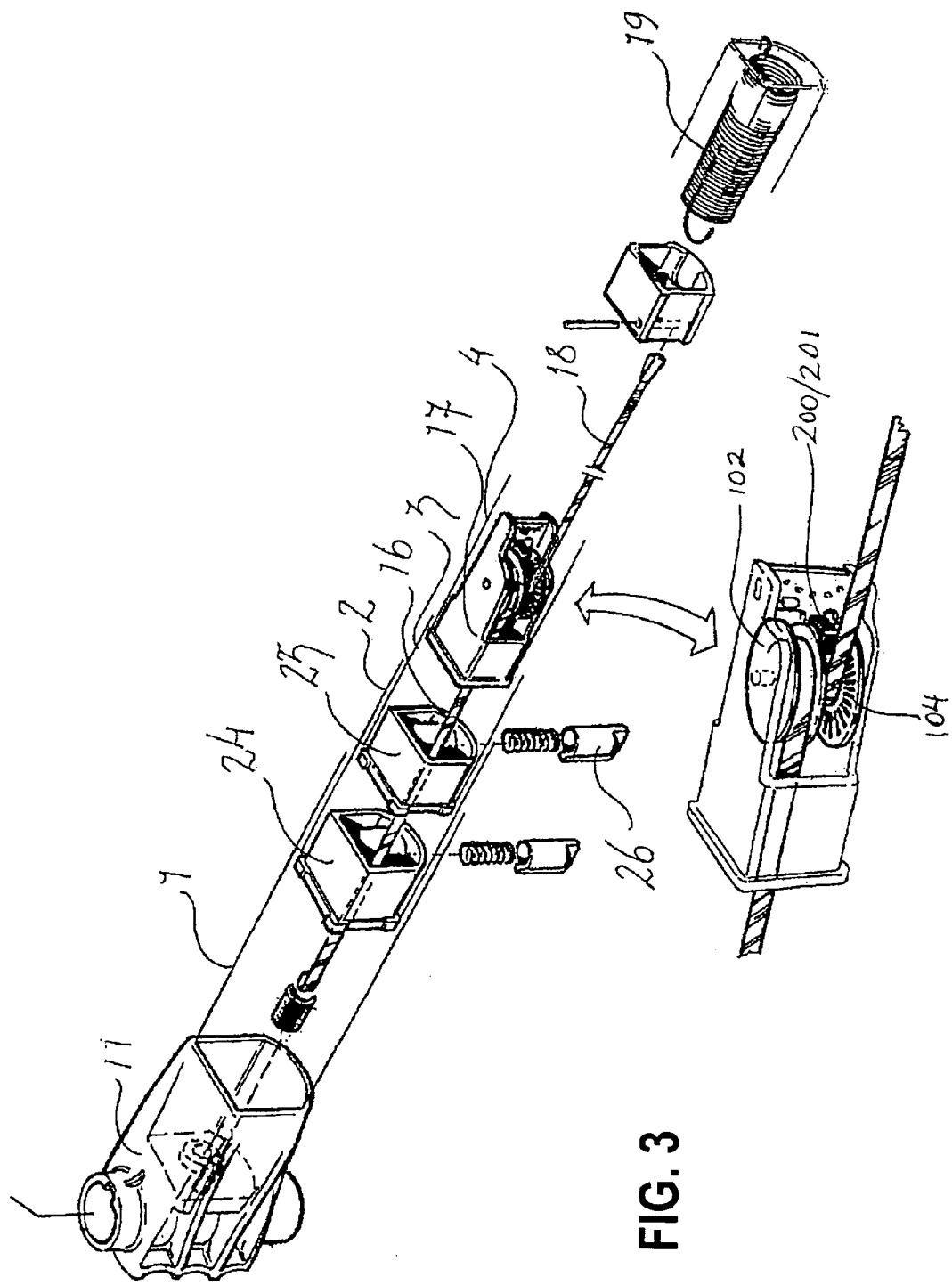
FIG. 3 shows the ruler in a perspective view.

A ruler 100 shown in FIGS. 1–4 includes telescoping tubes 1–4 with tube 4 positioned inside tube 3, and so on. A magnetic fastening bracket 5 is provided at one end of ruler 100 in contact with the tube, while at the other end of the ruler, a perpendicular mandrel 6 is arranged with a shaft 15 that can be locked in a bracket 7.

The magnetic fastening bracket 5 includes a conical mandrel 8 that is internally snapped over a ball, that in turn, using a short essentially cylindrical shaft 10, is detachably fastened to an end piece 11 positioned at the outer end of the ruler. On the conical mandrel 8, a circular magnet 12 is displaceable axially, and fastened in a casing 14 that holds a pressure spring 13. Using the spring 13, the casing 14 is pushed away from the cone 8 and the ball 9 towards the ruler itself. The spring 13 is, however, sufficiently weak in relation to the force exerted by the magnet so that when the cone is positioned in the intended measuring hole, the magnet is moved, against the force of the spring, into contact with the metal around the hole. The resulting force of the magnet pushes against the hole using the ball and spring. By choosing cone 8 according to hole diameter, and simply snapping off and on different cones 8, the universal joint can be located with its center of movement level with the hole. Thus, the ruler will measure distances precisely to the center of the hole.

At the other end of the ruler, a digital display is arranged so that it is integrated with the bracket 7 for the mandrel 6. The digital display includes a number of control buttons. The display can either indicate the measured distance between the center of the universal joint and the tip of the mandrel 6, or, alternatively may be adjusted so that it shows 0 for a first measure and then only displays differences relative to this value so that users get a displacement measurement so that the vehicle can be repaired.

The length of measurements obtained by the ruler are sent to the digital display using a thin metal tape 16, a drum 102, teeth 104, a light source 200 and photo sensitive element 201. The thin metal tape 16 extends from the end of the ruler that includes magnetic fastening bracket 5 to the inner end of an innermost tube 4. A measuring unit 17 is fastened to the innermost tube 4. The tape 16 is wound on a small drum 102 inside measuring unit 1. On the same drum 102 a band 18 is arranged with a winding direction opposite that of tape 16, and extends in the opposite direction to tape 16, i.e., towards the bracket 7. The band 18 is connected via a pulling spring 19 to the bracket 7. Since the area of the drum 102 where the band 18 is wound has a smaller diameter than the area of the drum 102 where the measuring tape 16 is wound, the spring length required to keep the metal tape 16 stretched is reduced.

The drum 102 is further provided with a radially extending rim of small pins or teeth 104. When the drum 102 rotates, the pins 104 pass between a light source and a photosensitive element so that each pin emits a pulse. These pulses can then be counted by the digital display device [not shown] and used as data for the measuring function of ruler 100. Furthermore, measuring unit changes, i.e., from inches to millimeters, and changes in the diameter of coil diameter of tape 16 are accounted for by the digital display device, and the data is adjusted accordingly.

In addition, the above described digital display device is very light and robust so that it will not be damaged if the ruler is handled carelessly.

As previously mentioned, the ruler 102 consists of guides for telescoping tubes 1–4. The innermost tube 4 has a guide [not shown] positioned in the next smallest tube 3. Also, the two middle tubes 2 and 3 have guides 24 and 25, respectively, positioned inside said tubes. The guides 24 and 25 are also provided with spring biased contact heels 26 to eliminate any play. These contact heels also serve to prevent the tubes from being drawn out of each other. The tubes 1–3 also have outer guides 27–29 that serve as seals.

Figure 5:
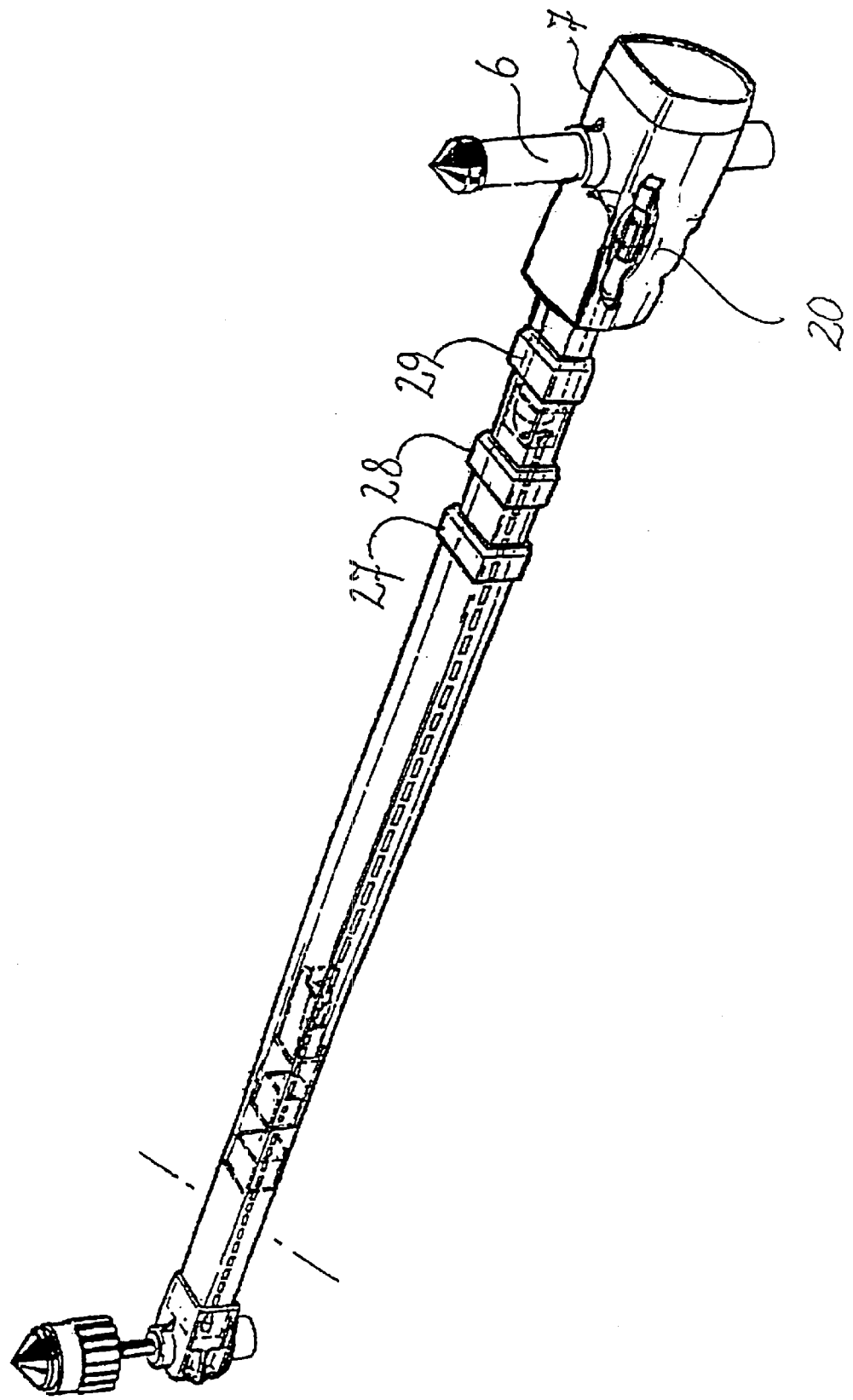
FIG. 5 shows an adjustable spirit level on the side of the ruler.

Tube 4 is preferably at the same end provided with a spirit level 20. The inclination of the spirit level 20 is adjustable in relation to the longitudinal direction of the ruler. This inclination adjustment is carried out by the spirit level being positioned in a bracket 21 in spirit level end 22, and using an adjustment screw 23 located at the opposite end 107. The bracket is furthermore able to swivel in the bracket 7 around an axle arranged vertically and perpendicular relative to the length direction of the ruler. In this way it becomes possible to adjust the spirit level so that it is horizontal by first applying the ruler to undamaged parts of the car and with a mandrel length that locates the ruler in the datum plane of the car or parallel therewith. As soon as the spirit level is horizontal the ruler is parallel to the datum plane. In this way, precise height measurements become possible. If the adjustment of the spirit level is necessary or practical for the ruler to extend in the opposite direction of the vehicle, the spirit level bracket 21 is pivoted one half turn around the vertical pivot axle so that despite the turn about of the ruler, the spirit level can indicate the datum plane. In this way, the number of errors is considerably reduced and the precision of executed measurements increases. The spirit level may either, as shown in FIG. 4, be located on top of the ruler facing the vehicle that is to be measured, or alternatively the spirit level may be arranged on the side of the ruler but so that it still can be swiveled 180° to enable the above operation, as shown in FIG. 5.

The device described above is extremely easy to handle, precise and dramatically facilitates repair work. The above disclosure is in no way limiting, and one skilled in the art would recognize that the ruler may be provided with different types of adaptation pieces that may be added at both ends of the ruler for adapting to specific types of measurements and/or objects on which the ruler is used. Furthermore, one might consider that instead of measuring sizes, height, depth, etc., an expected or prescribed value for a measurement can first be entered and the ruler applied to an object to obtain a value difference.

The spirit level may also be illuminated with a light emitting diode or the like.

What is claimed is:

1. An extension ruler for symmetry measurements of vehicles and for transfer of data or figures to a display wherein the extension ruler comprises a tape extending from one end of the ruler to the other end where the tape is wound on a drum spring biased in the winding direction, which drum is provided with teeth and that the passage of these is detected and counted by means of a light source and a photo diode and that the drum rotation detected in this way is used to provide a measure of the extending of the ruler.

2. The extension ruler according to claim 1, wherein the spring bias is achieved by a band wound on the same drum as the tape and fastened in a pull spring.

3. The extension ruler according to claim 2, wherein the band is wound onto a part of the drum that has a smaller diameter than the one where the tape is wound.

4. The extension ruler according to claim 1, wherein? the changing diameter of the tape when wound is taken into consideration before the measured values are presented on the display.

5. The extension ruler according to claim 1, and further comprising a spirit level arranged pivotable in one end and adjustable in the other end, said spirit level is able to swivel around a vertical axis between two positions 180° apart.

6. The extension ruler according to claim 5, wherein the spirit level is arranged on the top of the ruler.

7. The extension ruler according to claim 5, wherein the spirit level is arranged on the side of the ruler.

8. The extension ruler according to claim 1, wherein the ruler in the end opposite to the display provided end is provided with a magnetic fastening means including a conical part that is connected to the ruler and that around the conical part a displaceable magnet is arranged lightly spring biased away from the tip of the conical part, and that the magnetic force is greater than the spring bias.

9. The extension ruler according to claim 1, wherein the display is arranged in one end of the ruler, in particular in the end with the measure mandrel.

10. The extension ruler according to claim 8, wherein the conical part is articulated on a ball so as to be essentially level with a hole in said vehicle.

* * * * *